(12) United States Patent
Briscoe

(10) Patent No.: US 6,431,216 B1
(45) Date of Patent: Aug. 13, 2002

(54) PROTECTIVE TUBE ASSEMBLY

(76) Inventor: Terry L. Briscoe, 11399 NW. Ridge Rd., Portland, OR (US) 97229

( * ) Notice: Subject to any disclaimer, the term of this patent is extended or adjusted under 35 U.S.C. 154(b) by 0 days.

(21) Appl. No.: 09/713,923

(22) Filed: Nov. 15, 2000

(51) Int. Cl.[7] .................................................. F16L 57/00
(52) U.S. Cl. ........................ 138/110; 138/149; 138/162; 138/166; 138/169
(58) Field of Search .................. 138/110, 149, 138/162, 166, 167, 169

(56) References Cited

U.S. PATENT DOCUMENTS

| | | | |
|---|---|---|---|
| 256,060 A | 4/1882 | Seagrave | |
| 462,047 A | 10/1891 | Hurst | |
| 490,649 A | 1/1893 | Garretson | |
| 777,552 A | 12/1904 | Smith | |
| 990,658 A | 4/1911 | Kumpf | |
| 1,343,706 A | 6/1920 | Buller | |
| 1,499,954 A | 7/1924 | Stiles | |
| 1,692,529 A | * 11/1928 | Zagorski ...................... | 138/162 |
| 2,915,088 A | 12/1959 | Felter | |
| 3,682,434 A | * 8/1972 | Boenig ........................ | 138/162 |
| 4,105,051 A | * 8/1978 | Visentin ...................... | 138/162 |
| 4,228,826 A | * 10/1980 | Campbell, Jr. .............. | 138/155 |
| 4,260,181 A | * 4/1981 | Curtin ......................... | 138/162 |
| 4,298,554 A | * 11/1981 | Vogel et al. ................. | 138/166 |
| 4,619,292 A | 10/1986 | Harwood | |
| 4,647,713 A | 3/1987 | de Nijs et al. | |
| 5,006,386 A | * 4/1991 | Menichini .................... | 138/167 |
| 5,007,666 A | * 4/1991 | Kyfes ........................... | 138/162 |
| 5,022,685 A | * 6/1991 | Stiskin et al. ................ | 138/166 |
| 5,140,761 A | 8/1992 | Coffman et al. | |
| 5,875,821 A | * 3/1999 | Dumser et al. ............. | 138/162 |
| 6,247,500 B1 | * 6/2001 | McMahon ................... | 138/162 |
| 6,315,005 B1 | * 11/2001 | Sproule, III ................. | 138/162 |

* cited by examiner

Primary Examiner—James Hook
(74) Attorney, Agent, or Firm—Chernoff, Vilhauer, McClung & Stenzel, LLP

(57) ABSTRACT

A protection device for protecting a cylindrical structure has a pair of sections. The pair of sections when assembled form a tube. Each of the sections has inclined opposing mating surfaces. The sections have interlocking structures to resist longitudinal and transverse movement of the two sections with respect to one another.

32 Claims, 6 Drawing Sheets

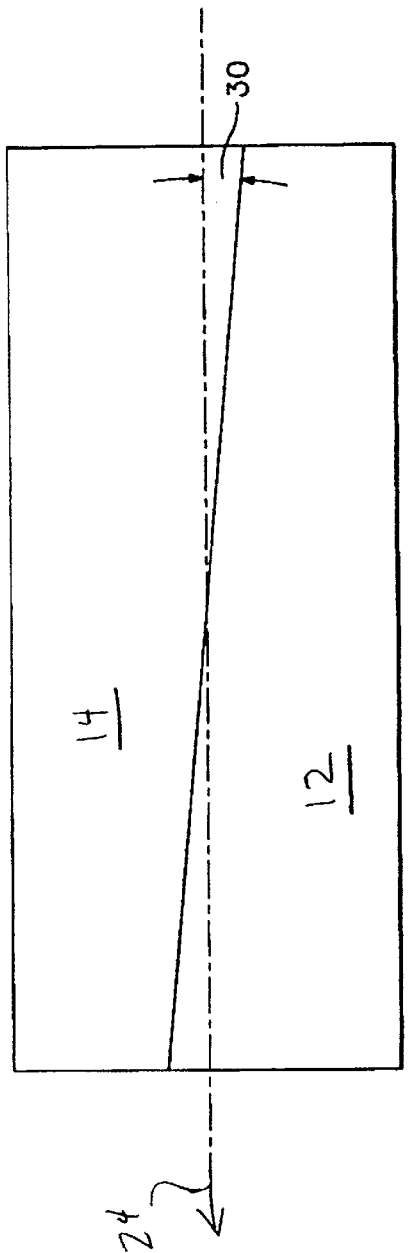
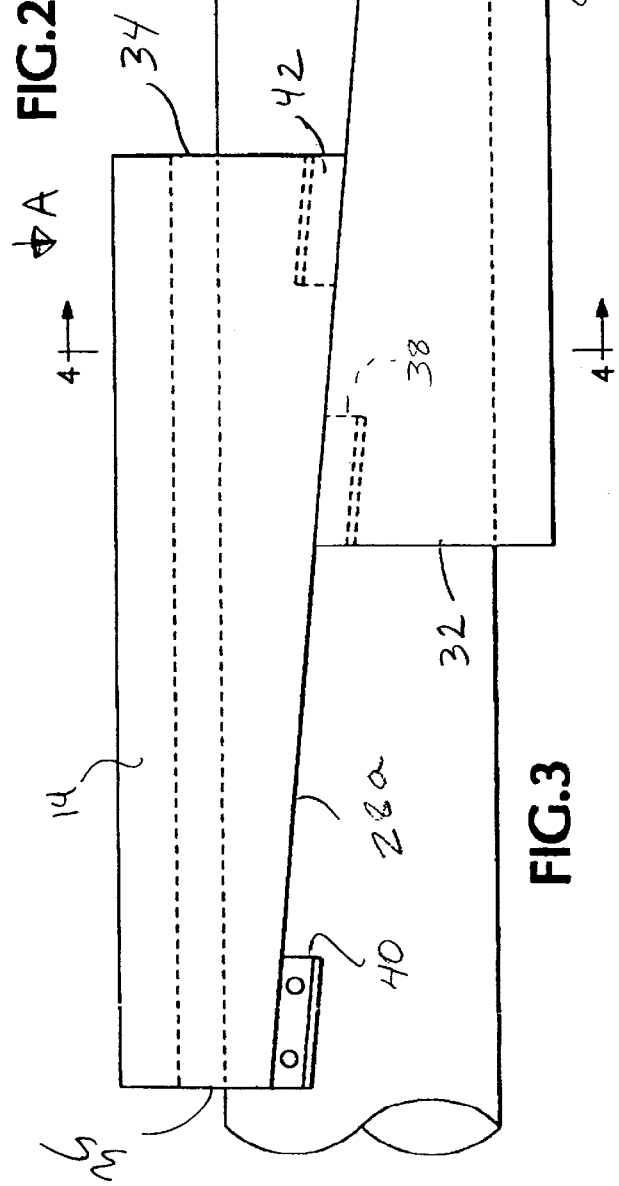

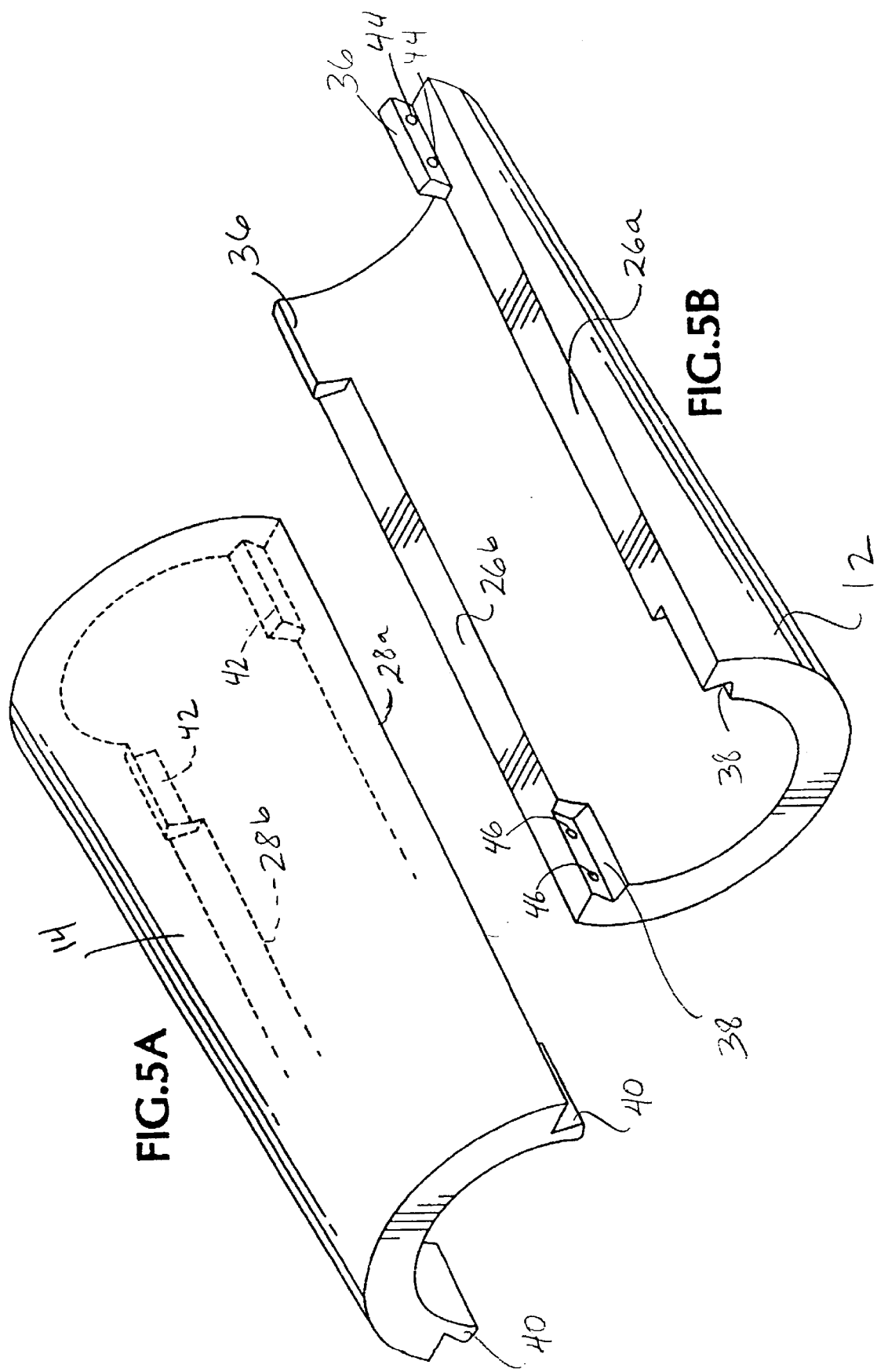

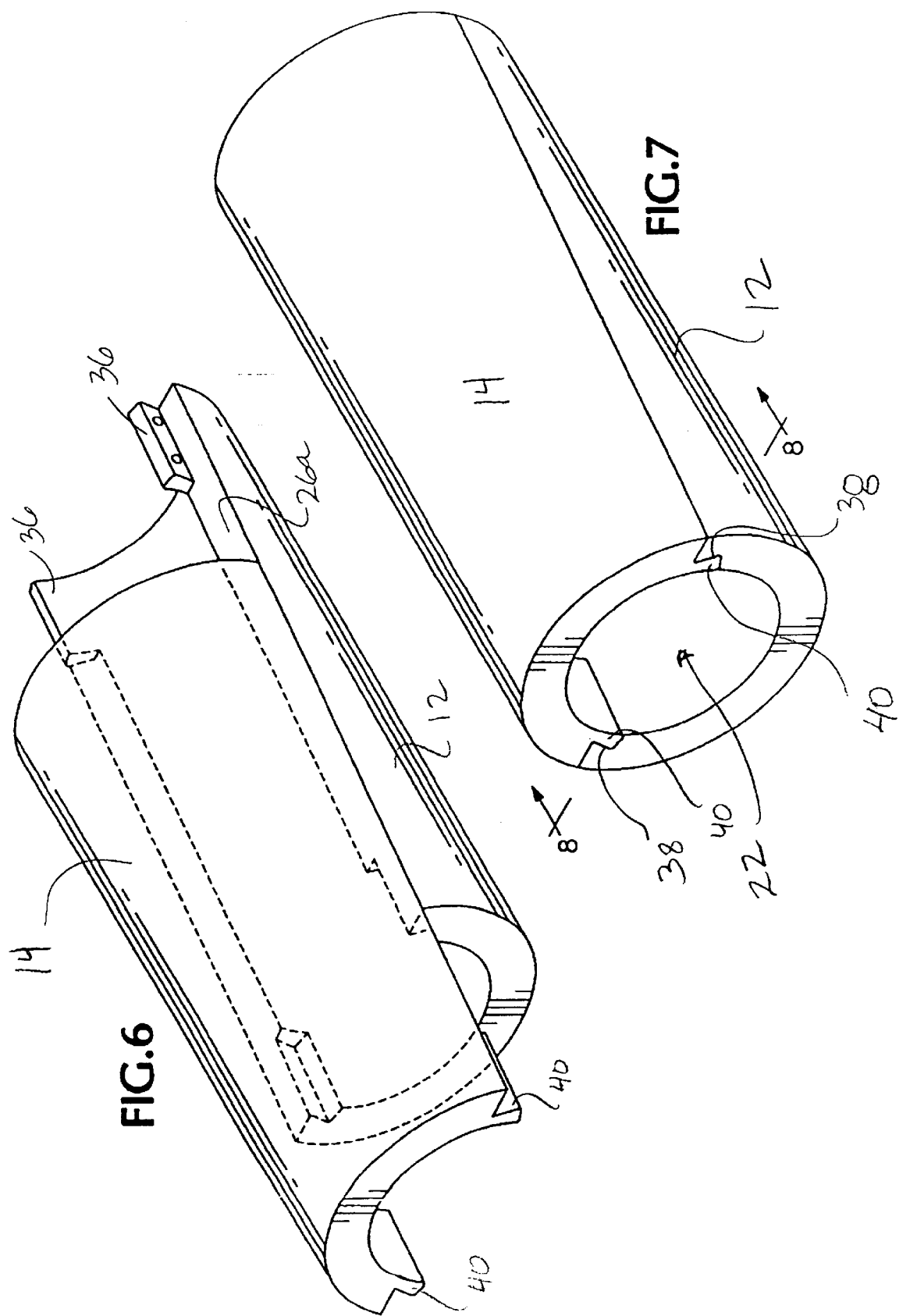

PROTECTIVE TUBE ASSEMBLY

BACKGROUND OF THE INVENTION

The present invention is directed toward a wear protector for protecting cylindrical structures such as pipes, cables, tubes and the like.

There are many applications where it is desired to protect a cylindrical structure from external wear or damage. For example, it is known to provide cylindrical sleeves to protect a line or cable, as disclosed in Coffman, et al., U.S. Pat. No. 5,140,761. Many other examples of cylindrical structures abound for which it may be desired to protect the structure from damage, wear, abrasion, electrical contact, etc. For example, it may be desired to protect an underground utility cable, a pipeline, a fiber optic line, an electrical power transmission line, etc.

Protecting long cylindrical structures by providing an external protective tube-like structure, such as a sheath, presents a number of problems. First, the protective structure must surround the cylindrical structure, but this may be difficult or impossible to accomplish with an installed cylindrical structure. For example, in Coffman, et al., U.S. Pat. No. 5,140,761, it is necessary to disconnect at least one end of the line in order to install or replace the protective sleeve.

Yet another problem is that the protective device should be held in place relative to the cylindrical structure. Otherwise, the protective device may move relative to the cylindrical structure, which may expose a portion of the cylindrical structure to damage or wear. Even worse, movement of the protective device may itself abrade or wear against the cylindrical structure.

Several efforts have been made to provide protective structures, but none have proved satisfactory. For example, efforts have been made to provide sectional pieces that may be assembled together to surround a pipe. Examples of the like are disclosed in Kumft, U.S. Pat. No. 990,658; Hurst, U.S. Pat. No. 462,047; Harwood, U.S. Pat. No. 4,619,292; and DeNijs, et al., U.S. Pat. No. 4,647,713. Nevertheless, the use of two section members requires that the sections be secured to one another. In Hurst, the entire assembly is held together through bands. In Harwood, the two sections are welded together. In DeNijs, et al., the two sections are attached to one another by means of corresponding projections and slots. While these various fastening mechanisms are functional to assemble the two sections into a protective covering, they nevertheless do not address the problem of fixing the protective device in position relative to the cylindrical structure. They are also unwieldy to assemble.

In a similar fashion, efforts have been made to provide coupling structures to repair broken pipes and the like, but such coupling structures entail several drawbacks. For example, to repair a broken underground water pipe, the pipe must be unearthed or otherwise exposed. A sufficient amount of earth around the pipe must also be removed to allow the pipe to be cut, and to allow sufficient space to secure repair parts to the damaged pipe. In the case of steel pipe, this requires cutting a section of pipe out, threading both ends of the existing damaged pipe, and then adding a coupler to the system. The coupler is expensive and difficult to install. In addition, it inserts a weak point into a pipe which has already failed for one reason or another. If the pipe is formed from a flexible material, such as plastic, the repair is easier but it is still required to cut the pipe cleanly, remove enough earth lengthwise of the pipe to allow the ends of the pipe to be raised in the air and to insert a coupler between the two cut ends. Alternatively, four 90° elbow sections may be provided to reduce the amount of earth that must be removed lengthwise. This, however, requires additional removal of earth from around the broken portion of the pipe, and also decreases water flow and induces weak points into the pipe.

What is therefore desired is a protective device for a cylindrical structure that protects the structure from external influences such as wear or abrasion, that may be easily and quickly placed around existing installed cylindrical structures, that remains in fixed relation to the structure, that is easy to disassemble if desired, and that may be easily and inexpensively manufactured.

BRIEF SUMMARY OF THE INVENTION

The present invention overcomes the aforesaid drawbacks of the prior art by providing a pair of sections, which when assembled form a tube that surrounds the cylindrical structure to be protected. Each of the sections has inclined opposing mating surfaces. One of the sections has a tongue and the other of the sections has a cooperating groove which together prevent transverse movement of the two sections with respect to one another when assembled. One of the sections has a locking member to resist longitudinal movement of the sections with respect to one another when the sections are assembled.

In a preferred embodiment, the locking member is a protrusion, and the other section defines a recess for receiving the protrusion when assembled. When assembled, the protrusion and recess matingly engage with one another to resist longitudinal movement of the sections with respect to one another.

In another aspect of the invention a method is provided for protecting a cylindrical structure. First, a pair of sections are formed, the pair of sections forming a tube when assembled. Each of the sections has inclined opposing mating surfaces. One of the sections has a tongue and the other of the sections has a cooperating groove to prevent transverse movement of the sections with respect to one another when assembled. One of the sections is placed adjacent to the cylindrical structure to be protected. The other section is then engaged with the one section. The sections are then slid together so that the tongue engages the groove and the protrusion engages the recess, thereby preventing both transverse movement of the two sections with respect to one another. The sections are further joined together to resist longitudinal movement with respect to one another.

The various aspects of the present invention provide several advantages over the prior art protective devices. The protection device may be easily and quickly placed around an existing installed cylindrical structure. The inclined mating surfaces allow the two wide ends of the section to be initially engaged, thereby providing clearance to accept a cylindrical structure. As the two sections are slid together, they tighten together around the cylindrical structure thereby remaining in a fixed position relative to the cylindrical structure. The use of mating protrusions and recesses to prevent longitudinal movement of the two sections with respect to one another allows easy assembly and disassembly if desired. The sections may also be easily and inexpensively manufactured.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 2 shows a side elevation view of an assembled protection device.

FIG. 3 shows a side elevation view of two sections being installed on a cable.

FIGS. 5a and 5b show perspective views of sections of the present invention.

FIG. 6 shows a perspective assembly view of two sections of the present invention.

FIG. 7 shows a perspective view of an assembled protection device.

DETAILED DESCRIPTION OF THE PREFERRED EMBODIMENTS

Figure 1:
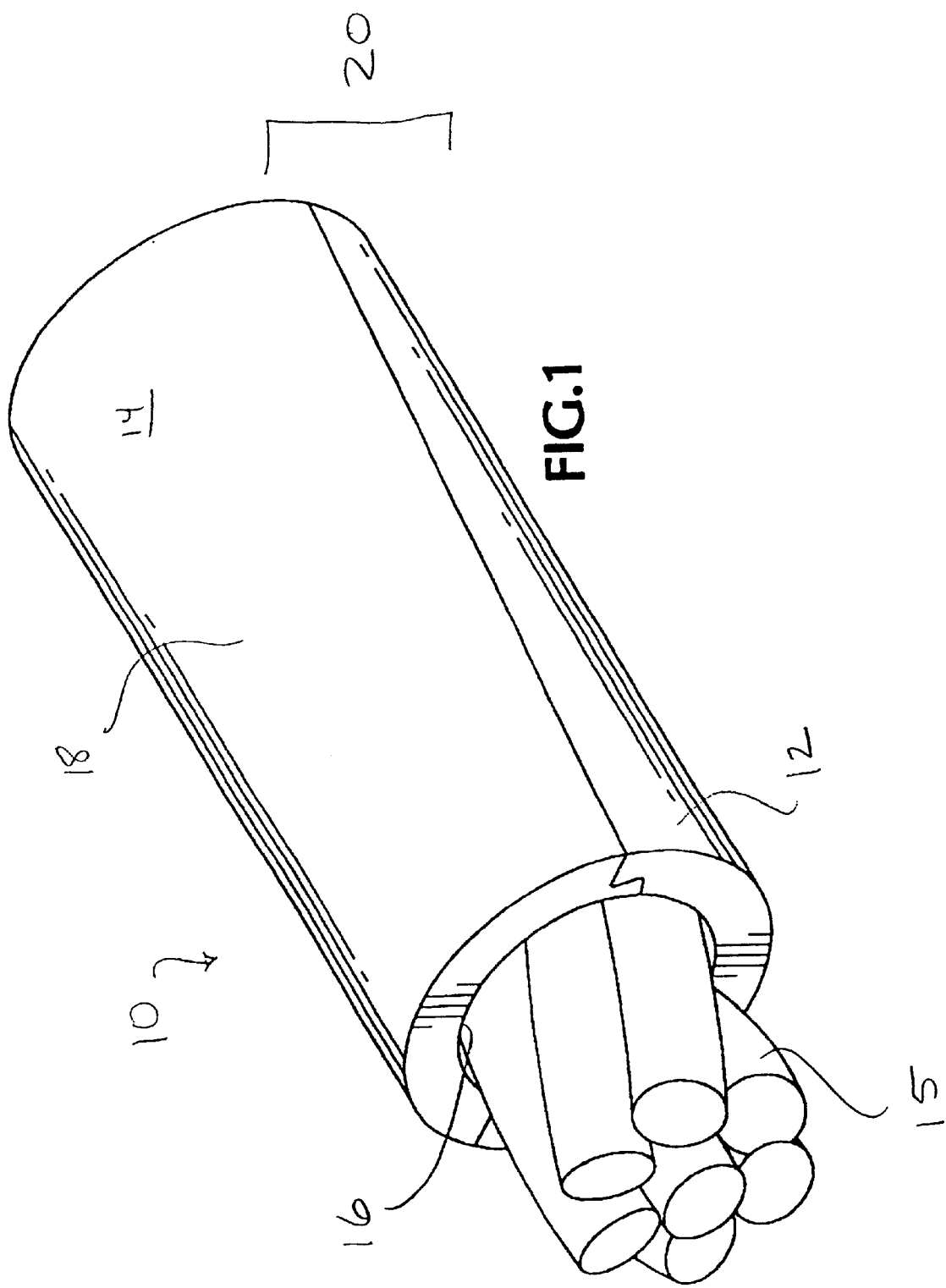
FIG. 1 shows a perspective view of a protection device of the present invention assembled about a cable.

The present invention relates to a protective device for protective covering for a cylindrical structure such as a pipe, wire or cable. FIG. 1 shows a protection device 10 consisting of two interlocking sections 12 and 14 that are on opposite sides of the cylindrical structure 15. The term "cylindrical structure" is used broadly to describe an elongate structure having a roughly circular cross-section such as a cable or pipe. The two sections 12 and 14 are mechanically secured to one another to surround the cylindrical structure 15, thereby protecting the structure from external hazards. In use, the protective device may protect or insulate any type of long round object from abrasion, electrical input or output, harm from excavation or cutting, etc. The protection device may be used on wire rope or cable, electrical cable, fiber optic lines, water lines, phone cables, or any type of utility line.

In one aspect of the invention, shown in FIGS. 1–8, the protection device 10 is comprised of two identical interlocking sections 12 and 14, each of which comprises a portion of a cylinder. When assembled together, the two sections 12 and 14 collectively form a tube 20 that surrounds the cylindrical structure 15 to be protected. The so-formed tube, consisting of the two assembled sections, has an interior surface 16 and an exterior surface 18. The interior surface 16 is shaped so as to correspond to the shape of the cylindrical structure 15 to be protected. Thus, the interior surface 16 may have a circular cross-section, or some other shape, depending on the shape of the cylindrical structure 15. In some applications, the interior cavity 22 (see FIG. 7) defined by the two sections is preferably smaller than the cylindrical structure 15, so that the two sections 12 and 14 when assembled about the cylindrical structure 15 will tightly grip the cylindrical structure and remain fixed in position. The exterior surface 18 may be any shape desired, and does not necessarily need to be cylindrical in shape. Thus, the exterior surface 18 may have a circular, square, or other cross-section.

In the preferred embodiment shown in FIGS. 1–8, the two sections 12 and 14 are identical. Sections 12 and 14 result from splitting a cylinder lengthwise along a line that is slightly inclined relative to the longitudinal axis 24 of the cylinder. (See FIG. 2.) This allows each of the sections to accommodate easily one-half of the cylindrical structure to be protected. It also eases manufacturing requirements, since only a single section shape must be made, and also eases assembly, since any two sections will fit together to form the required protection device. However, while preferred, it is not necessary that the two sections be identical with one another, so long as the two sections may be assembled together. For example, one section may be larger than the other, thus comprising a larger portion of the assembled tube. Thus, one of the sections could have an enlarged exterior shape to perform a desired function.

Each of the sections 12 and 14 has a pair of inclined mating surfaces, shown as 26a and 26b for section 12 and 28a and 28b for section 14. When assembled (as in FIGS. 3 and 5), the respective mating surfaces of the two sections are in contact with and oppose each other. That is, surface 26a opposes surface 28a, while surface 26b opposes surface 28b. In the embodiment shown in the figures, the mating surfaces are flat, but other surface shapes may be used as desired, so long as the two surfaces may be brought into sliding engagement as discussed further below. In fact, in some applications, it may be desired that the mating surfaces have corresponding exterior surfaces. For example, to provide a better seal between the sections, one mating surface may have a convex cross-section while the opposing surface has a concave cross-section. In addition, gaskets or other sealing materials may be provided between the opposing mating surfaces to provide an improved seal.

Figure 4:
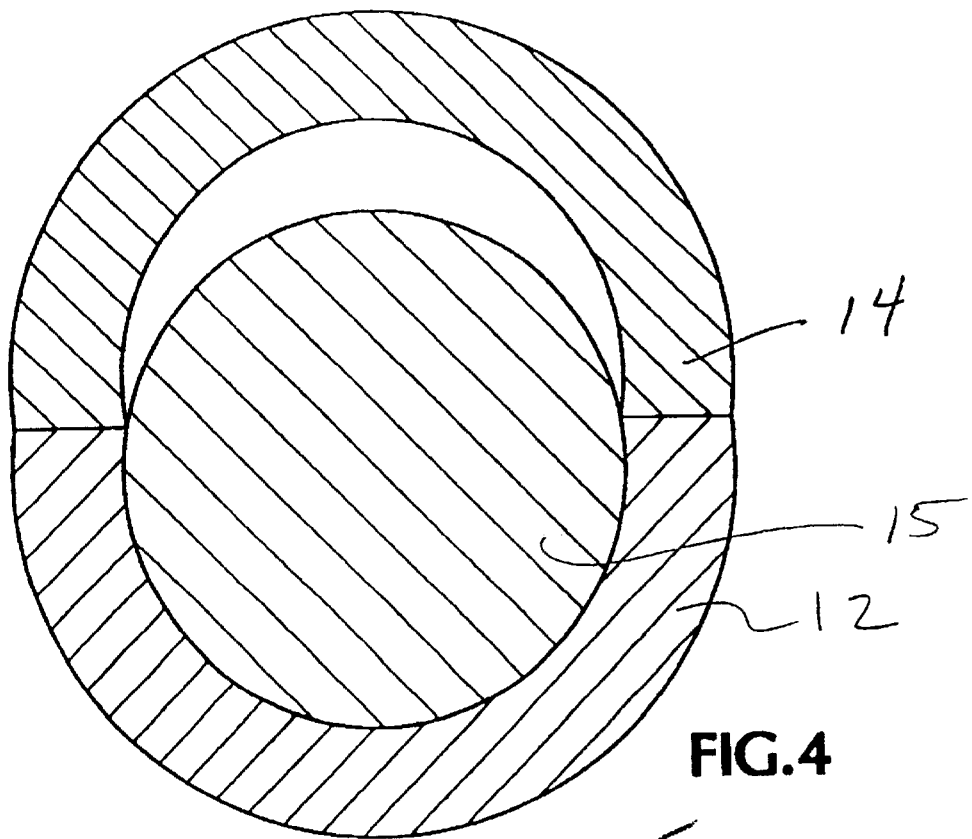
FIG. 4 shows a cross-section through the line 4—4 of FIG. 3.
Figure 8:
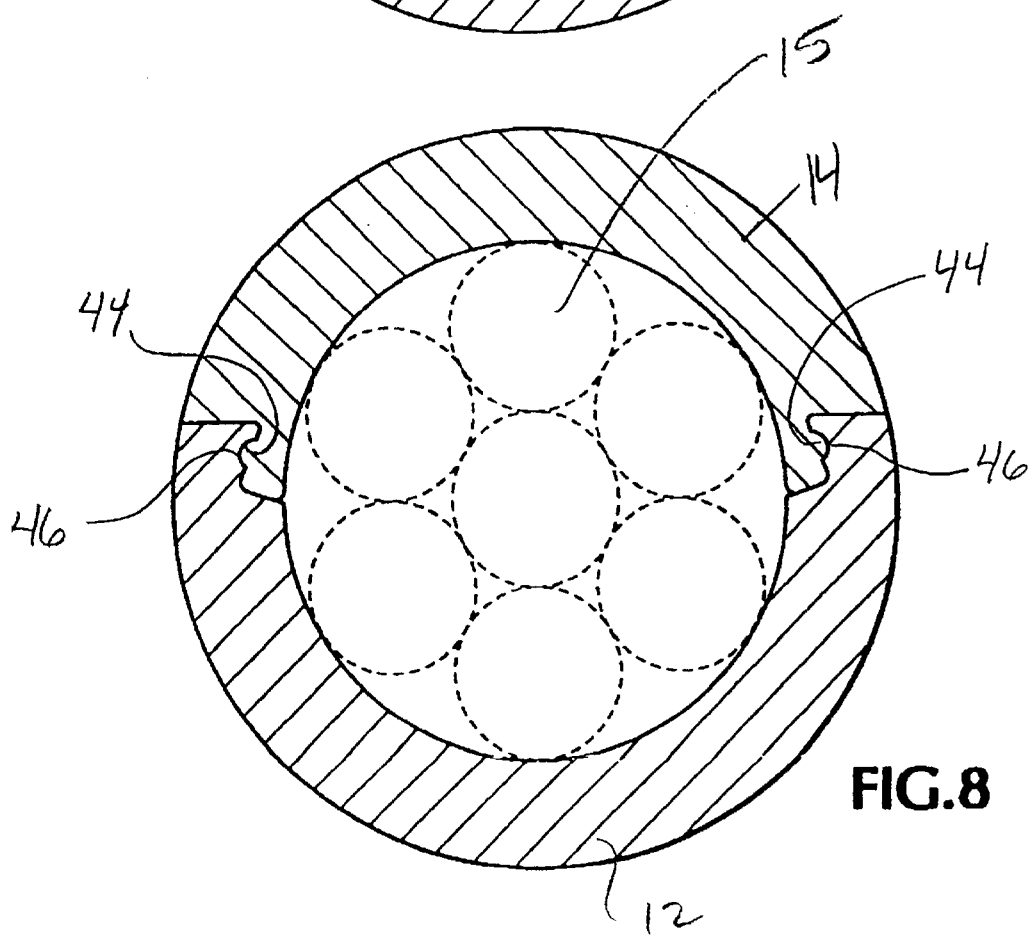
FIG. 8 shows a cross-section through the line 8—8 of FIG. 7 showing an enclosed cable in phantom lines.

As shown particularly in FIGS. 2 and 3, the mating surfaces of the two sections are inclined at an angle 30 with respect to the longitudinal axis 24 of the assembled tube. An angle of inclination of from 5° to 10° from the longitudinal axis 24 or centerline allows the two sections to be assembled easily on an existing installed cylindrical structure 15 without the necessity of disconnecting the structure 15 to install the protection device 10. Referring now to FIG. 3, assembly is accomplished by first placing one of the sections, such as 12, around the cylindrical structure 15. The second section 14 is then oriented relative to the section 12 so that the wide portion 32 of section 12 engages wide portion 34 of section 14. Because the two wide portions 32 and 34 are the first portions of the sections 12 and 14 to engage, there is sufficient clearance to accept the cylindrical structure between the two sections, as shown in FIG. 4. The two sections may then be slid together, as in FIGS. 6 and 7, so that the assembly tightens on the installed line, as shown in FIGS. 1 and 8.

Depending on the angle of inclination used, the flexibility of the materials used for the sections, and the compressibility of the cylindrical structure, it may be necessary to enlarge slightly the interior surface 16 near the wide portions 32 and 34 so that the sections may be placed over the cylindrical structure and achieve a good fit.

The use of a pair of sections each having inclined mating surfaces which allow the two sections to be slid together into assembly provides several advantages over conventional protective structures. Assembling the sections by first engaging the wide portions of the two sections together (as illustrated in FIGS. 3 and 4) allows a protection device to be used that has an interior cavity that is narrower than the external diameter of the structure to be protected. This allows the assembled sections to be tightened about the cylindrical structure to securely hold the protection device in place relative to the cylindrical structure. The protection device thus provides protection to the structure at a fixed location and does not chafe or abrade the cylindrical structure. In addition, the present invention allows assembly of the protection device around cylindrical structures that are already installed. Thus, a protection device may be provided without the necessity of disassembling or cutting the cylindrical structure. Similarly, worn protection devices may be easily replaced.

The opposing sections 12 and 14 are provided with corresponding structures for preventing transverse movement (shown by arrows A in FIG. 2) of the two sections 12 and 14 away from each other once assembled. In the embodiment shown in FIGS. 5a and 5b, section 12 has a pair of dovetail-shaped rails 36 and a pair of slots 38, while section 14 has a corresponding pair of rails 40 and a pair of slots 42. As shown more particularly in FIGS. 6–7, the rails of section 12 slide into the slots of section 14, while the rails of section 14 slide into the slots of section 12. The dovetail shapes of the rails and slots provide an interlocking structure as shown in cross-section in FIG. 8 when the two sections are assembled that prevents transverse movement of the two sections with respect to one another when the two sections are assembled. The use of slots and rails of the present invention provides an additional advantage in that the structures used to prevent transverse movement of the two sections with respect to one another are protected from external wear and abrasion because they do not extend beyond the exterior surface of the tube. Thus, unlike sections which are held together using external bands, or which are bolted together or otherwise joined using protruding external fasteners, there is no risk that the external fasteners will be worn or abraded off of the two sections and allow the two sections to become disassembled.

While a particular arrangement of rails and slots is shown in FIGS. 1–8, other tongue and groove structures may be provided to prevent transverse movement of the two sections with respect to one another. Thus, one section could be provided with a tongue projecting from each of the mating surfaces, while the other section could be provided with a pair of grooves defined within the mating surfaces. Another possible method for preventing transverse movement of the two sections with respect to one another would be to provide mating structures projecting from the exterior portions of each of these two sections. One of the structures of these sections, for example, section 14, would define a slot or groove, while the exterior structure of the other section 12 would be in the form of a rail which fits within the groove. Yet another alternative would be to define in one of the mating surfaces, such as 26a, a recess, while the corresponding opposing mating surface 28b would have a protrusion which would matingly engage with the longitudinal recess. The sheer strength of the longitudinal protrusion would hold the two sections together. In addition, while FIGS. 1–8 show the interlocking rails and slots extending along a small portion of the length of the two sections, the interlocking structure may be provided along greater portions of the length of each of the two sections. For identical symmetrical sections the interlocking structures may extend such that the rails extend half the length of one section while the corresponding slots extend along the other half of the section. Alternatively, rails and slots may be provided along the entire length of each section, however in such event the sections would not be symmetrical.

In addition to an interlocking structure that resists transverse movement of the two sections with respect to one another, the two sections also each include an interlocking structure for resisting longitudinal movement of the two sections with respect to one another. Once the two sections have been assembled to form a tube surrounding the cylindrical structure, the two sections are joined or fixed together to resist longitudinal movement of the two sections with respect to one another. Preferably, the sections include cooperating locking members or surfaces that resist longitudinal movement when engaged with one another. In a preferred embodiment, shown particularly in FIGS. 5a and 5b, each of the rails is provided with one or more protrusions 44 in the form of bumps or tabs. Likewise, each slot is provided with one or more mating recesses 46 which correspond to the shape of the protrusions. When the sections are slid together, the protrusion forces the rails and slots to spring apart. As the two sections are slid slightly more, the protrusion drops into the cooperating recess and becomes locked in place, thereby resisting longitudinal movement of the two sections relative to one another. The protrusion/recess arrangement may be permanent or releasable depending on the specific application.

Alternatively, other locking members may be provided to resist longitudinal movement of the two sections with respect to the other. For example, a wedging taper, such as a Morse taper, may be used.

The two sections may be secured together simply be means of the interlocking structures provided to resist longitudinal and transverse movement of the two sections, or may include additional means for securing the two sections together. For example, the parting seam formed between the mating surfaces of the two sections may also have an exterior weld groove to facilitate welding of the two sections together. Alternatively, glue or some other bonding agent may be used to provide a stronger, more permanent bond if desired. As yet another alternative, mechanical fasteners may be provided to secure the two sections together.

Figure 9:
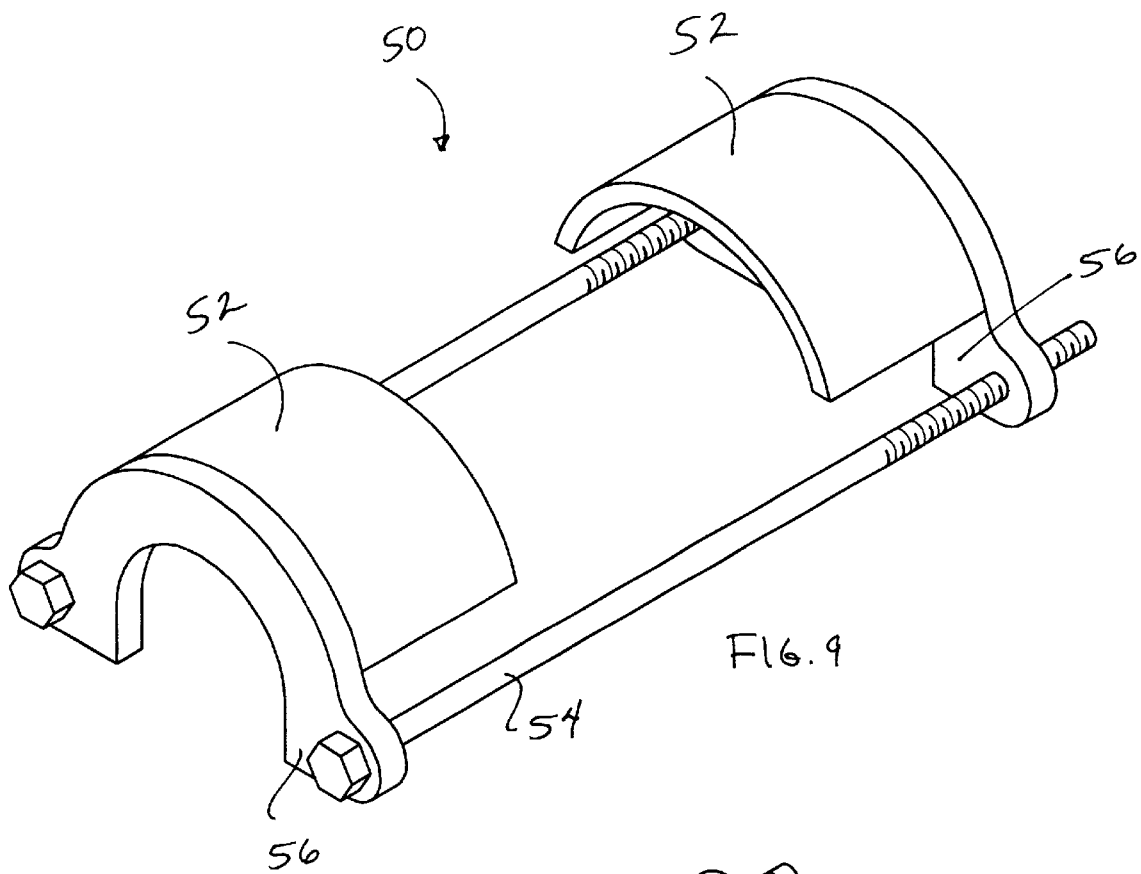
FIG. 9 shows a perspective view of an assembly mechanism for assembling a protection device.
Figure 10:
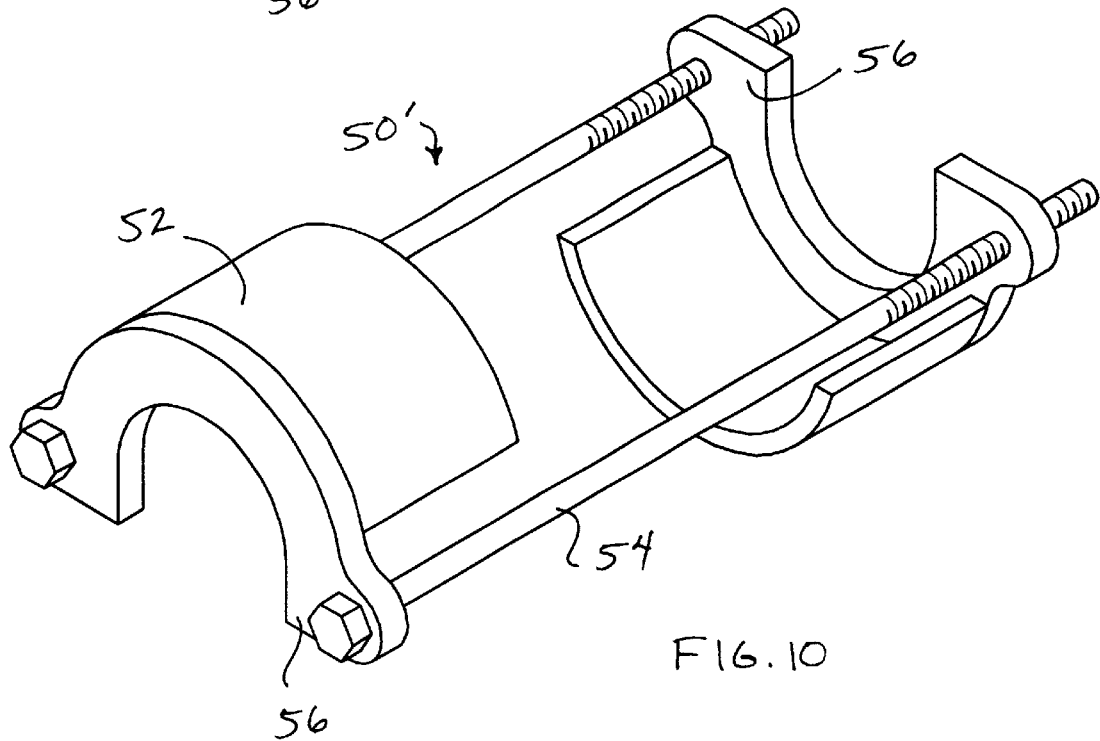
FIG. 10 shows an alternative embodiment of an assembly mechanism.

The two sections may be assembled using a variety of methods. Where the sections are made of relatively flexible material, and/or the cylindrical structure to be protected is compressible, then the two sections may be joined together by hand. However, for sections made from stiff materials and/or relatively incompressible cylindrical structures, it may be necessary to obtain some kind of mechanical advantage to assemble the two sections together. For example, FIGS. 9 and 10 show an assembly mechanism 50 comprised of a pair of identical end sections joined together by a pair of bolts 54. In one embodiment, the two end sections 52 face each other and the bolts are assembled through holes in the end sections along the same sides of the assembly mechanism as shown in FIG. 9. To assemble the two sections 12 and 14 together, the assembly mechanism 50 is placed over the two sections 12 and 14 of the protection device, the protection device already being partially installed on the cylindrical structure 15. The bolts 54 are then tightened to forcibly slide the two end sections 52 toward each other. In this method, the engaging portion 56 of the end section 52 is long enough to extend past the centerline of the cylindrical structure so as to engage the narrow portion 33 or 35 of section 12 or 14 sufficiently to pull the two sections 12 and 14 into assembly.

Alternatively, using the assembly mechanism 50' of FIG. 10, the two end sections 52 face each other but are on opposite sides of the cylindrical structure 15. In this method the engaging portions 56 of the two end sections 52 need only extend slightly past the centerline of the cylindrical structure 15. The assembly mechanism 50 is placed adjacent to the narrow portions 33 and 35 of the two sections 12 and 14. The bolts 54 are then tightened to force the end two sections 52 toward each other to complete the assembly.

Likewise, the assembly mechanism may also be used to disassemble the protection device 10. The assembly mechanism 50' of FIG. 10 may be placed around an assembled protection device 10 such that the end sections 52 engage the wide portions 32 and 34 of the respective sections 12 and 14. As the bolts are tightened, the protection device is disassembled very easily and safely.

Alternatively, other methods for assembling or disassembling the protection device include use of a hydraulic type press, either hand operated or machine operated, or the use of a jacking mechanism.

The protection device may be used in a wide variety of environments and in many different types of applications. Exemplary applications include providing a protection device around a buried line that can be easily detected or located, providing a float or weight for the top or bottom of fish nets, providing electrically insulating material around electrical transmission lines or cables, providing abrasion resistance for a cable, protecting a pipe containing fluids from cuts or punctures, providing warning labels around a hazardous line, providing padding or soft materials for covering wires or poles in a play area, providing heavy weights to hang on power lines, surrounding a flammable line with a Phi fire retardant material, protecting a bonded or spliced joint, or providing barriers to rodents on ship mooring lines. Accordingly, a wide variety of materials may be used to form the sections depending on the desired application. Exemplary materials include metal, plastic, ceramic, polystyrene, etc. In addition, the sections may be painted or otherwise colored to provide a visual warning, and may also be provided with labels or other printed materials.

The two sections may be formed of one or more materials, and the two sections may also be comprised of different materials from one another. For example, each section may have an internal electrically conductive portion and an external electrically insulating portion. Such a section could be used to repair a broken electrical cable. The internal conductive portion would provide an electrical connection between the two ends of the cable, while the insulative exterior would provide protection from the power cable.

In a preferred embodiment of the invention, the protection device is used to protect cables or lines which are used in connection with earth moving equipment. For example, the protection device may surround the exterior of a hoist or drag rope used in connection with a dragline bucket. In such applications, the protection device is formed from a strong durable metal, such as high-hardened steel, or other suitable material that may be placed around the cables to protect them from wear from dirt and debris.

In another preferred aspect of the invention the protection device may be used to repair a broken pipe. For example, when used to repair an underground pipe, the earth around the broken pipe is removed to expose the crack or break for cleaning, and to provide room for one of the sections to be placed underneath the break. The other section is then placed on top of the first section and the two sections are assembled. The protection device may have additional seals, such as a sealing mechanism to prevent leaks. For example, a protection device may be provided with a sealing mechanism such as a piece of rubber compound placed over the break, while the sections of the protection device would compress and hold the sealing mechanism in position to seal the leak.

This method of repairing a pipe has several advantages over prior methods. The method minimizes the amount of earth needed to be removed from around an underground pipe in order to accomplish the repair. The resulting joint, formed by the protection device itself, may be stronger than the original pipe itself. The method is also very quick and efficient.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A protection device for protecting a cylindrical structure, comprising:

a pair of sections, said pair of sections when assembled forming a tube, each of said sections having inclined opposing mating surfaces, one of said sections having a tongue and the other of said sections having a cooperating groove to prevent transverse movement of said sections with respect to one another when assembled, said inclined opposing mating surfaces being aligned with respect to one another to allow said sections to slide longitudinally into assembly to form said tube; and one of said sections having a locking member to resist longitudinal movement of said sections with respect to one another when said sections are assembled.

2. The protection device of claim 1 wherein said pair of sections are identical to one another.

3. The protection device of claim 1 wherein said inclined opposing mating surfaces define an angle of inclination of from 5° to 10° from a centerline of said tube.

4. The protection device of claim 1 wherein said tongue and said groove are dovetail-shaped.

5. The protection device of claim 1 wherein said sections are formed from metal.

6. The protection device of claim 1 wherein at least one of said sections is formed from plastic.

7. The protection device of claim 1 wherein said protection device is securely tightened about said cylindrical structure.

8. The protection device of claim 1 wherein said locking member is a protrusion and the other of said one of said sections defines a recess for receiving said protrusion.

9. The protection device of claim 1 wherein each of said sections comprises a portion of a cylinder.

10. The protection device of claim 1 wherein said tube has a non-circular cross-section.

11. The protection device of claim 1 wherein said sections are different from one another.

12. The protection device of claim 11 wherein said sections have different shapes from one another.

13. The protection device of claim 1 wherein said mating surface of one of said sections has a convex cross-section and the opposing mating surface has a concave cross-section.

14. The protection device of claim 1 wherein each of said sections provides thermal insulation.

15. The protection device of claim 1 wherein each of said sections has an interior electrically conductive portion.

16. A method for protecting a cylindrical structure, comprising the steps of:

(a) forming a pair of sections, said pair of sections when assembled forming a tube, each of said sections having inclined opposing mating surfaces, one of said sections having a tongue and the other of said sections having a cooperating groove to prevent transverse movement of said sections with respect to one another when assembled;

(b) placing one of said sections adjacent to said structure;

(c) engaging the other of said sections with said one of said sections and sliding said sections together so that said tongue engages said groove and said sections form said tube surrounding said cylindrical structure; and (d) joining said sections together so as to resist longitudinal movement of said sections with respect to one another.

17. The method of claim 16 wherein said pair of sections are identical to one another.

18. The method of claim 16 wherein said inclined opposing mating surfaces define an angle of inclination of from 5° to 10° from a centerline of said tube.

19. The method of claim 16 wherein said tongue and said groove are dovetail-shaped.

20. The method of claim 16 wherein said sections are formed from metal.

21. The method of claim 16 wherein at least one of said sections is formed from plastic.

22. The method of claim 16 wherein said protection device is securely tightened about said cylindrical structure.

23. The method of claim 16 wherein said sections are joined together by forming a locking member on one of said sections.

24. The method of claim 23 wherein said locking member is a protrusion and a recess is formed in the other of said sections for receiving said protrusion.

25. The method of claim 16 wherein said each of said sections comprises a portion of a cylinder.

26. The method of claim 16 wherein said tube has a non-circular cross-section.

27. The method of claim 16 wherein said sections are different from one another.

28. The method of claim 27 wherein said sections have different shapes from one another.

29. The method of claim 16 wherein said cylindrical structure is a cable.

30. The method of claim 16 wherein said cylindrical structure is a pipe.

31. The method of claim 30 wherein said protection device is used to repair a broken pipe.

32. The method of claim 31 wherein said protection device further includes a sealing member placed over a broken portion of said pipe.

* * * * *

UNITED STATES PATENT AND TRADEMARK OFFICE
CERTIFICATE OF CORRECTION

PATENT NO.    : 6,431,216 B1
DATED         : August 13, 2002
INVENTOR(S)   : Terry L. Briscoe It is certified that error appears in the above-identified patent and that said Letters Patent is hereby corrected as shown below:

<u>Column 7,</u>
Line 19, delete the word "Phi".

Signed and Sealed this

Ninth Day of September, 2003

JAMES E. ROGAN
*Director of the United States Patent and Trademark Office*